US012677287B2

(12) United States Patent
Zhu

(10) Patent No.: US 12,677,287 B2
(45) Date of Patent: Jul. 7, 2026

(54) DCI TRANSMISSION METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 438 days.

(21) Appl. No.: 17/798,519

(22) PCT Filed: Feb. 10, 2020

(86) PCT No.: PCT/CN2020/074665
§ 371 (c)(1),
(2) Date: Aug. 9, 2022

(87) PCT Pub. No.: WO2021/159254
PCT Pub. Date: Aug. 19, 2021

(65) Prior Publication Data
US 2023/0128632 A1    Apr. 27, 2023

(51) Int. Cl.
*H04W 72/23* (2023.01)

(52) U.S. Cl.
CPC .................................. *H04W 72/23* (2023.01)

(58) Field of Classification Search
CPC .................................................... H04W 72/23
See application file for complete search history.

(56) References Cited

U.S. PATENT DOCUMENTS

| | | | |
|---|---|---|---|
| 2013/0235821 A1 | 9/2013 | Chen et al. | |
| 2019/0182812 A1 | 6/2019 | Shimezawa et al. | |
| 2019/0342907 A1* | 11/2019 | Huang | H04W 72/23 |
| 2022/0039144 A1* | 2/2022 | Alabbasi | H04W 72/23 |

FOREIGN PATENT DOCUMENTS

| | | | | |
|---|---|---|---|---|
| CA | 3034014 A1 | * | 8/2019 | ............. H04W 72/23 |
| CA | 2977284 C | * | 7/2023 | ........... H04W 72/232 |
| CN | 102387588 A | | 3/2012 | |
| CN | 103491640 A | | 1/2014 | |
| CN | 103959730 A | | 7/2014 | |
| CN | 104009820 A | * | 8/2014 | ............. H04W 72/23 |
| CN | 105992361 A | | 10/2016 | |
| CN | 107710845 A | | 2/2018 | |
| CN | 107734661 A | | 2/2018 | |

(Continued)

OTHER PUBLICATIONS

Notification to Grant Patent Right for CN Application No. 202080000247.7 dated Aug. 23, 2023, (1p).

(Continued)

*Primary Examiner* — Saad A. Waqas
(74) *Attorney, Agent, or Firm* — Arch & Lake LLP; Hao Tan; Shen Wang

(57) ABSTRACT

A Downlink Control Information (DCI) transmission method, performed by a terminal, is provided. In the method, the terminal receives DCI, in which a type of the DCI includes a first type or a second type. DCI of the first type carries a control instruction for scheduling data transmission in one cell. DCI of the second type carries a control instruction for scheduling data transmission in at least two cells.

20 Claims, 24 Drawing Sheets

Base station

Terminal

S510, receive high-layer signaling or physical layer signaling which carries configuration information of DCI of at least two types S420, receive DCI of a first type or DCI of a second type sent on one cell according to the configuration information

(56)     References Cited

FOREIGN PATENT DOCUMENTS

| CN | 108024274 A | | 5/2018 | |
| CN | 109548163 A | | 3/2019 | |
| CN | 109792423 A | * | 5/2019 | ........... H04W 72/23 |
| CN | 110475369 A | | 11/2019 | |
| JP | 2020014082 A | | 1/2020 | |
| WO | 2018031928 A1 | | 2/2018 | |
| WO | 2019135632 A1 | | 7/2019 | |

OTHER PUBLICATIONS

Search Report for CN Application No. 202080000247.7 dated Aug. 11, 2023, (3p).

CATT, "Discussion on enhanced UL configured grant transmission", 3GPP TSG RAN WG1 Meeting #98bis, R1-1910346, Chongqing, CN Oct. 14-18, 2019, (5p).

Huawei, "DCI contents in NR and two-stage DCI designs", 3GPP TSG RAN WG1 Meeting #89, R1-1706949, Hangzhou, CN May 15-19, 2017, (6p).

International Search Report of International Application No. PCT/CN2020/074665 dated Oct. 22, 2020 with English translation, (6p).

First Office Action of the Chinese application issued in application No. 202311160449.X dated on Apr. 18, 2026, (6p).

* cited by examiner

LTE downlink common
pilot region

LTE control
region

Shared
resource region

Base station
Terminal
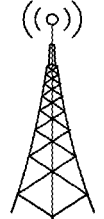
S310, receive DCI sent on one cell, in which a type of the DCI includes a first type or a second type; DCI of the first type carries a control instruction for scheduling data transmission in one cell; and DCI of the second type carries a control instruction for scheduling data transmission in at least two cells
Fig. 3

Base station
Terminal
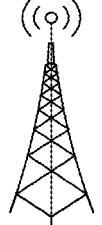
S510, receive high-layer signaling or physical layer signaling which carries configuration information of DCI of at least two types
S420, receive DCI of a first type or DCI of a second type sent on one cell according to the configuration information
Fig. 5

Base station

Terminal

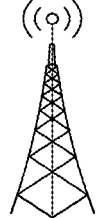

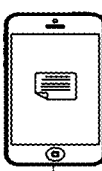

S610, receive an activation instruction of configuration information

S710, receive DCI of a first type sent on one cell according to configuration information of the DCI of the first type in response to determining that the activation instruction activates the configuration information of the DCI of the first type; and receive DCI of a second type sent on the one cell according to configuration information of the DCI of the second type in response to determining that the activation instruction activates the configuration information of the DCI of the second type

Fig. 7

Base station

Terminal

S410, receive configuration information of DCI of at least two types

S810, receive, on a corresponding physical resource block, DCI of a first type or DCI of a second type sent on one cell according to a mapping relation Base station Terminal

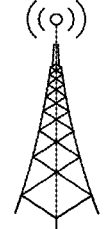

S310, receive DCI sent on one cell, in which a type of the DCI includes a first type or a second type; DCI of the first type carries a control instruction for scheduling data transmission in one cell; and DCI of the second type carries a control instruction for scheduling data transmission in at least two cells S910, descramble the received DCI S920, determine the type of the DCI as the first type in response to determining that the DCI is successfully descrambled by using a first descrambling sequence; and determine the type of the DCI as the second type in response to determining that the DCI is successfully descrambled by using a second descrambling sequence

Fig. 9

Base station

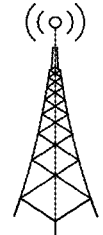

Terminal

S310, receive DCI sent on one cell, in which a type of the DCI includes a first type or a second type; DCI of the first type carries a control instruction for scheduling data transmission in one cell; and DCI of the second type carries a control instruction for scheduling data transmission in at least two cells S111, obtain a radio network temporary identity (RNTI) carried by the DCI S112, determine the type of the DCI as the first type in response to determining that the RNTI is a first RNTI; and determine the type of the DCI as the second type in response to determining that the RNTI is a second RNTI

Fig. 11

Base station
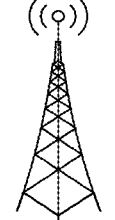
Terminal
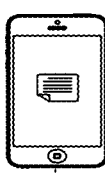
S141, send DCI on one cell, in which a type of the DCI includes a first type or a second type; DCI of the first type carries a control instruction for scheduling data transmission in one cell; and DCI of the second type carries a control instruction for scheduling data transmission in at least two cells
Fig. 14

Base station Terminal

S141, send DCI on one cell, in which a type of the DCI includes a first type or a second type; DCI of the first type carries a control instruction for scheduling data transmission in one cell; and DCI of the second type carries a control instruction for scheduling data transmission in at least two cells S151, send configuration information of DCI of at least two types, in which the configuration information is used for allowing a terminal to receive the DCI of the first type or the DCI of the second type

Fig. 15

Base station  Terminal

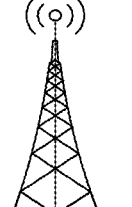

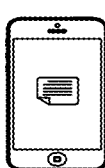

S141, send DCI on one cell, in which a type of the DCI includes a first type or a second type; DCI of the first type carries a control instruction for scheduling data transmission in one cell; and DCI of the second type carries a control instruction for scheduling data transmission in at least two cells S161, send high-layer signaling or physical layer signaling which carries configuration information of DCI of at least two types

Fig. 16

Base station                                               Terminal

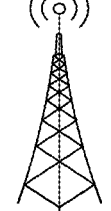

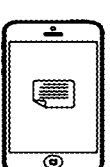

S141, send DCI on one cell, in which a type of the DCI includes a first type or a second type; DCI of the first type carries a control instruction for scheduling data transmission in one cell; and DCI of the second type carries a control instruction for scheduling data transmission in at least two cells S161, send high-layer signaling or physical layer signaling which carries configuration information of DCI of at least two types S171, send an activation instruction of the configuration information, in which the activation instruction is used for allowing a terminal to receive the DCI according to the configuration information activated by the activation instruction

Fig. 17

Base station

Terminal

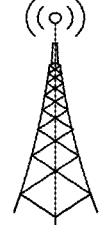

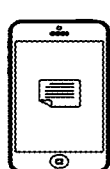

S141, send DCI on one cell, in which a type of the DCI includes a first type or a second type; DCI of the first type carries a control instruction for scheduling data transmission in one cell; and DCI of the second type carries a control instruction for scheduling data transmission in at least two cells S161, send high-layer signaling or physical layer signaling which carries configuration information of DCI of at least two types S181, send an activation instruction for activating configuration information of the DCI of the first type in response to determining that scheduling for data transmission in a plurality of cells is not supported; and send an activation instruction for activating configuration information of the DCI of the second type in response to determining that scheduling for data transmission in the plurality of cells is supported

Fig. 18

Base station

Terminal

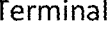

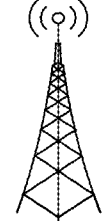

S191, scramble DCI by using a first scrambling sequence in response to determining that a type of the DCI is a first type; and scramble the DCI by using a second scrambling sequence in response to determining that the type of the DCI is a second type S141, send DCI on one cell, in which the type of the DCI includes the first type or the second type; the DCI of the first type carries a control instruction for scheduling data transmission in one cell; and the DCI of the second type carries a control instruction for scheduling data transmission in at least two cells

Fig. 19

Base station

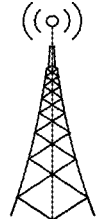

Terminal

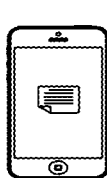

S201, configure an RNTI as a first RNTI in response to determining that a type of DCI is a first type; and configure the RNTI as a second RNTI in response to determining that the type of the DCI is a second type

S141, send DCI on one cell, in which the type of the DCI includes the first type or the second type; the DCI of the first type carries a control instruction for scheduling data transmission in one cell; and the DCI of the second type carries a control instruction for scheduling data transmission in at least two cells

Fig. 20

DCI TRANSMISSION METHOD AND APPARATUS, AND COMMUNICATION DEVICE AND STORAGE MEDIUM

CROSS REFERENCE TO RELATED APPLICATION

The present application is a U.S. National Stage of International Application No. PCT/CN2020/074665, filed on Feb. 10, 2020, the entire content of which is incorporated herein by reference for all purposes.

BACKGROUND

A new Internet application technology such as new-generation augmented reality (AR), virtual reality (VR) and vehicle-to-vehicle communication constantly emerges, which brings up a higher requirement for a wireless communication technology and drives the wireless communication technology to continuously evolve so as to meet demands of application. A cellular mobile communication technology is in an evolution stage of a new-generation technology. An important characteristic of the new-generation technology is to support flexible configuration of various service types. Different service types have different requirements for the wireless communication technology. For example, an enhanced mobile broadband (eMBB) service type focuses primarily on requirements of large bandwidth, high rate and the like. An ultra reliable low latency communication (URLLC) service type focuses primarily on requirements of higher reliability, low latency and the like. A massive machine type communication (mMTC) service type focuses primarily on requirements of a large number of connections and the like. Accordingly, a new-generation wireless communication system needs a flexible and configurable design to support transmission of various service types.

SUMMARY

Examples of the present application disclose a method and apparatus for transmitting downlink control information (DCI), a communication device and a storage medium.

According to a first aspect of examples of the disclosure, a method for transmitting downlink control information (DCI) is provided and performed by a terminal, including:

receiving DCI sent on one cell of a base station, in which a type of the DCI includes a first type or a second type;

DCI of the first type carries a control instruction for scheduling data transmission in one cell; and DCI of the second type carries a control instruction for scheduling data transmission in at least two cells.

According to a second aspect of examples of the disclosure, a method for transmitting downlink control information (DCI) is further provided and performed by a base station, including:

sending DCI on one cell, in which a type of the DCI includes a first type or a second type; DCI of the first type carries a control instruction for scheduling data transmission in one cell; and DCI of the second type carries a control instruction for scheduling data transmission in at least two cells.

According to a third aspect of examples of the disclosure, a communication device is provided, including:

an antenna;

a memory; and a processor, connected with the antenna and the memory respectively and configured to, by executing an executable program stored on the memory, control the antenna to receive and send a wireless signal, such that steps of the method provided by any aforementioned technical solution can be executed.

According to a fourth aspect of examples of the disclosure, a non-transitory computer-readable storage medium is provided. The non-transitory computer-readable storage medium stores an executable program, in which the executable program, when executed by a processor, implements steps of the method provided by any aforementioned technical solution.

BRIEF DESCRIPTION OF THE DRAWINGS

FIG. 3 is a schematic diagram of a method for transmitting downlink control information (DCI) provided by an example of the disclosure.

FIG. 5 is a schematic diagram of a method for transmitting downlink control information (DCI) provided by another example of the disclosure.

FIG. 7 is a schematic diagram of a method for transmitting downlink control information (DCI) provided by another example of the disclosure.

FIG. 9 is a schematic diagram of a method for transmitting downlink control information (DCI) provided by another example of the disclosure.

FIG. 11 is a schematic diagram of a method for transmitting downlink control information (DCI) provided by another example of the disclosure.

FIG. 14 is a schematic diagram of a method for transmitting downlink control information (DCI) provided by another example of the disclosure.

FIG. 15 is a schematic diagram of a method for transmitting downlink control information (DCI) provided by another example of the disclosure.

FIG. 16 is a schematic diagram of a method for transmitting downlink control information (DCI) provided by another example of the disclosure.

FIG. 17 is a schematic diagram of a method for transmitting downlink control information (DCI) provided by another example of the disclosure.

FIG. 18 is a schematic diagram of a method for transmitting downlink control information (DCI) provided by another example of the disclosure.

FIG. 19 is a schematic diagram of a method for transmitting downlink control information (DCI) provided by another example of the disclosure.

FIG. 20 is a schematic diagram of a method for transmitting downlink control information (DCI) provided by another example of the disclosure.

DETAILED DESCRIPTION

Figure 1:
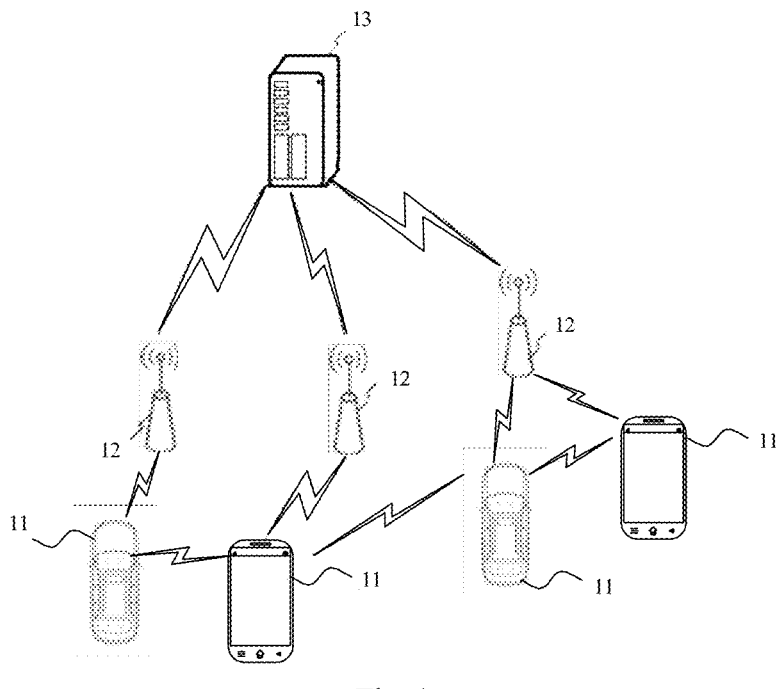
FIG. 1 is a schematic structural diagram of a wireless communication system provided by an example of the disclosure.

The examples will be described in detail here, and their examples are represented in the drawings. Unless otherwise indicated, when the following description refers to the drawings, the same number in the different drawings represents the same or similar element. Implementations described in the following examples do not represent all implementations consistent with the examples of the present application. Rather, they are merely examples of an apparatus and method consistent with some aspects of the examples of the present application as detailed in appended claims.

Terms used in the examples of the disclosure are merely intended to describe specific examples instead of limiting the examples of the disclosure. The singular such as "a/an" and "the" used in the examples of the disclosure and appended claims also intends to include a plural form unless other meanings are clearly indicated in context. It should be further understood that a term "and/or" used herein refers to and contains any one or all possible combinations of one or more associated listed items.

It should be understood that various information, possibly described by using terms such as first, second and third in the examples of the disclosure, are not supposed to be limited to these terms. These terms are merely used for distinguishing information of the same type. For example, without departing from the scope of the examples of the disclosure, first information may be also called second information, and similarly, the second information may be also called the first information. Depending on the context, a word "if" and "in case" used here may be constructed as "during . . . ", "when . . . " or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It should be understood that each element in each table provided by the present disclosure exists independently, and these elements are listed in the same table for example, but it does not mean that all elements in the table must exist at the same time according to the table. The value of each element is independent of the value of any other element in the table. It can be understood that the value of each element in the table is an independent example.

The present application relates to, but not limited to the technical field of wireless communication, in particular to a method and apparatus for transmitting downlink control information (DCI), a communication device and a storage medium.

With application of a new wireless communication technology, frequency resources allocated to an existing communication technology may be gradually allocated to the new communication technology for use. Thus, there may be a scenario where various types of cellular communication technologies coexist. For example, a 5G new radio (NR) system and an LTE system work on the same band of frequency-domain resource. On a frequency band where the LTE system and the 5G new radio system coexist, in order to guarantee normal work of the LTE system, a resource needing to be occupied by a channel of the LTE system is reserved. In this case, there may be fewer resources capable of being provided to the 5G new radio system for use, so the resources needed by the 5G new radio system may be limited. In order to improve a utilization ratio of the resources, various new downlink control information (DCI) types are introduced. However, with increasing of the DCI types, there are also more DCI types needing to be detected by a terminal when the terminal receives DCI, which results in higher complexity of detecting the DCI types by the terminal.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of terminals 11 and a plurality of base stations 12.

The terminal 11 may refer to a device providing a voice and/or data connectivity for a user. The terminal 11 may communicate with one or more core networks via a radio access network (RAN). The terminal 11 may be an Internet of Things terminal, such as a sensor device, a mobile phone (or called a "cell" phone) and a computer with the Internet of Things terminal, for example, the terminals may be a fixed, portable, pocket, hand-held, computer built-in or vehicle-mounted apparatus. For example, the terminals may be a station (STA), a subscriber unit, a subscriber station, a mobile station, a mobile, a remote station, an access point, a remote terminal, an access terminal, a user terminal, a user agent, a user device, or user equipment (UE). Or the terminal 11 may also be a device of an unmanned aerial vehicle. Or the terminals 11 may also be a vehicle-mounted device, for example, may be a trip computer with a wireless communication function, or a wireless communication device externally connected with the trip computer. Or the terminal 11 may also be a road-side infrastructure, for example, may be a street lamp, signal lamp or other road-side infrastructures with a wireless communication function.

The base station 12 may be a network side device in a wireless communication system. The wireless communication system may the 4th generation (4G) mobile communication system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN). Or the wireless communication system is an MTC system.

The base station 12 may be an evolution base station (eNB) adopted in the 4G system. Or the base station 12 may also be a base station (gNB) adopting a centralized distributed architecture in the 5G system. When adopting the centralized distributed architecture, the base station 12 usually includes a central unit (CU) and at least two distributed units (DU). Protocol stacks of a packet data convergence protocol (PDCP) layer, a radio link control (RLC) protocol layer and a media access control (MAC) layer are arranged in the central unit, a physical (PHY) layer protocol stack is arranged in the distributed units, and the examples of the disclosure do not limit a specific implementation of the base station 12.

A wireless connection may be established between the base station 12 and the terminal 11 through a wireless radio. In different implementations, the wireless radio is a wireless radio based on a fourth generation (4G) mobile communication network technology standard; or the wireless radio is a wireless radio based on a fifth generation (5G) mobile communication network technology standard, for example, the wireless radio is a new radio; or the wireless radio may also be a wireless radio based on a next generation mobile communication network technology standard of 5G.

In some examples, an end to end (E2E) connection may also be established between the terminals 11. For example, there are scenes of vehicle to vehicle (V2V) communication, vehicle to Infrastructure (V2I) communication and vehicle to pedestrian (V2P) communication and the like in vehicle to everything (V2X) communication.

In some examples, the above wireless communication system may also contain a network management device 13. The plurality of base stations 12 are connected with the network management device 13 respectively. The network management device 13 may be a core network device in the wireless communication system, for example, the network management device 13 may be a mobility management entity (MME) in an evolved packet core (EPC). Or the network management device may also be other core network devices, for example, a serving gateway (SGW), a public data network gateway (PGW), a policy and charging rules function (PCRF) unit or a home subscriber server (HSS), etc. The examples of the disclosure do not limit an implementation form of the network management device 13.

For better understanding the technical solution described by any one example of the disclosure, firstly, a scenario where various communication systems coexist is described through one example.

Figure 2:
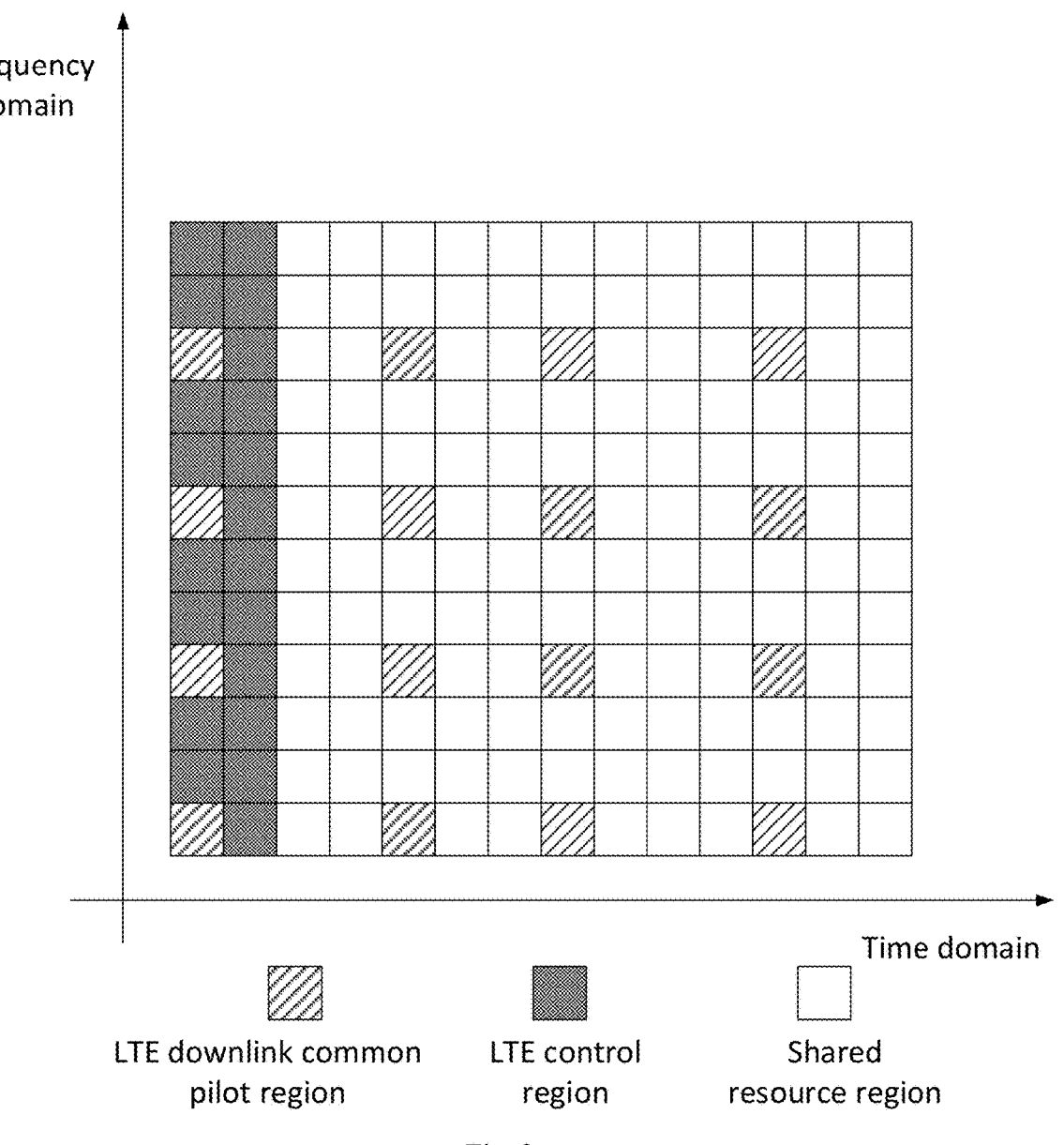
FIG. 2 is a schematic diagram of a scenario where an LTE system and a 5G new radio system coexist provided by an example of the disclosure.

As shown in FIG. 2, an example of the disclosure provides a scenario where an LTE system and a 5G new radio system coexist. On a frequency band where the LTE system and the 5G new radio system coexist, in order to guarantee normal running of the LTE system, a resource needing to be occupied by a channel of the LTE system is reserved. For example, there are an LTE downlink common pilot region in FIG. 2 and an LTE control region in FIG. 2. In this case, there are fewer resources capable of being provided to the 5G new radio system for use. In an example, a resource occupied by the LTE downlink common pilot region in FIG. 2 is used for sending a cell reference signal (CRS) by a base station. In an example, the LTE control region in FIG. 2 is used for transmitting PDCCH information of a service, downlink service information of a service, uplink service information of a service and the like.

In an example, scheduling for data transmission in other cells by a scheduling instruction in one cell may be realized based on a carrier aggregation technology. However, in the example, one scheduling instruction can merely schedule data transmission in one cell. Specific to the scenario where the LTE system and the 5G new radio system coexist, a problem of limited control resources of the 5G new radio system cannot be solved. A method for scheduling a plurality of cells through one scheduling instruction may cause introduction of many new DCI types, that is, there may be a great many DCI types needing to be detected by a terminal, so detection complexity of the terminal may be increased.

As shown in FIG. 3, an example of the disclosure provides a method for transmitting downlink control information (DCI), performed by a terminal and including:

step S310: DCI send on one cell is received.

For example, the terminal receives DCI sent on one cell of a base station.

A type of the DCI includes a first type or a second type; DCI of the first type carries a control instruction for scheduling data transmission in one cell; and DCI of the second type carries a control instruction for scheduling data transmission in at least two cells.

In an example, when a base station issues the downlink control information (DCI) to the terminal on the one cell, the terminal receives the downlink control information (DCI) sent by the base station. The DCI includes identification information of a cell where data transmission is performed. The terminal, after receiving the downlink control information (DCI), performs data transmission according to an indication of the downlink control information (DCI). For example, data transmission is performed in the cell indicated by the identification information. Here, data transmission may be to send uplink data to the base station or may also be to receive downlink data sent by the base station.

In an example, in response to determining that the type of the DCI is the first type, the DCI of the first type carries the control instruction for scheduling data transmission in the one cell; and in response to determining that the type of the DCI is the second type, the DCI of the second type carries the control instruction for scheduling data transmission in the at least two cells.

In an example, the terminal receives the DCI sent on the one cell, the DCI is the DCI of the first type, and the DCI of the first type carries the control instruction for scheduling data transmission in the one cell.

In another example, the terminal receives the DCI sent on one cell of a base station, the DCI is the DCI of the second type, and the DCI of the second type carries the control instruction for scheduling data transmission in the at least two cells. In another example, if the terminal receives the DCI on the plurality of cells at the same time, the DCI of the first type and the DCI of the second type may be received at the same time.

In an example, each cell may be provided with a carrier wave. Different cells adopt different carrier waves to realize coverage of a wireless signal in the cells and complete data transmission in the cells. For example, a cell A adopts a carrier wave 1 to realize coverage of the wireless signal in the cell, and a cell B adopts a carrier wave 2 to realize coverage of the wireless signal in the cell.

In an example, an information field of the DCI may carry identification information for distinguishing the types of the DCI. For example, in response to determining that first identification information is carried in the information field of the DCI, the DCI is the DCI of the first type; and in response to determining that second identification information is carried in the information field of the DCI, the DCI is the DCI of the second type. The second identification information is different from the first identification information.

In an example, scheduling the terminal for data transmission in the at least two cells may be to issue, in a first cell, a piece of downlink control information (DCI) for scheduling the terminal for data transmission in at least two second cells. Here, the second cells may be cells different from the first cell. For example, the first cell is the cell A, and the two second cells are the cell B and a cell C respectively. In another example, the second cells may include the first cell. For example, the first cell is the cell A, and the two second cells are the cell A and the cell B respectively. Here, identification information of the second cells may be carried in the downlink control information (DCI).

In the example of the disclosure, firstly, the DCI carrying the control instruction for scheduling data transmission in the one cell and the DCI carrying the control instruction for scheduling data transmission in the at least two cells are classified, and whether scheduling for data transmission in the one cell or scheduling for data transmission in the at least two cells may be determined fast by detecting the DCI of the two different types after the terminal receives the DCI, so that detection complexity is reduced, and detection efficiency is improved. Secondly, the DCI of the second type carries the control instruction for scheduling data transmission in the at least two cells. In this way, scheduling for data transmission in the at least two cells may be realized by issuing merely one piece of DCI, compared with a situation of scheduling for data transmission in one cell by merely one piece of DCI, overhead of control signaling during wireless communication can be effectively reduced, and a utilization ratio of wireless resources is increased.

Figure 4:
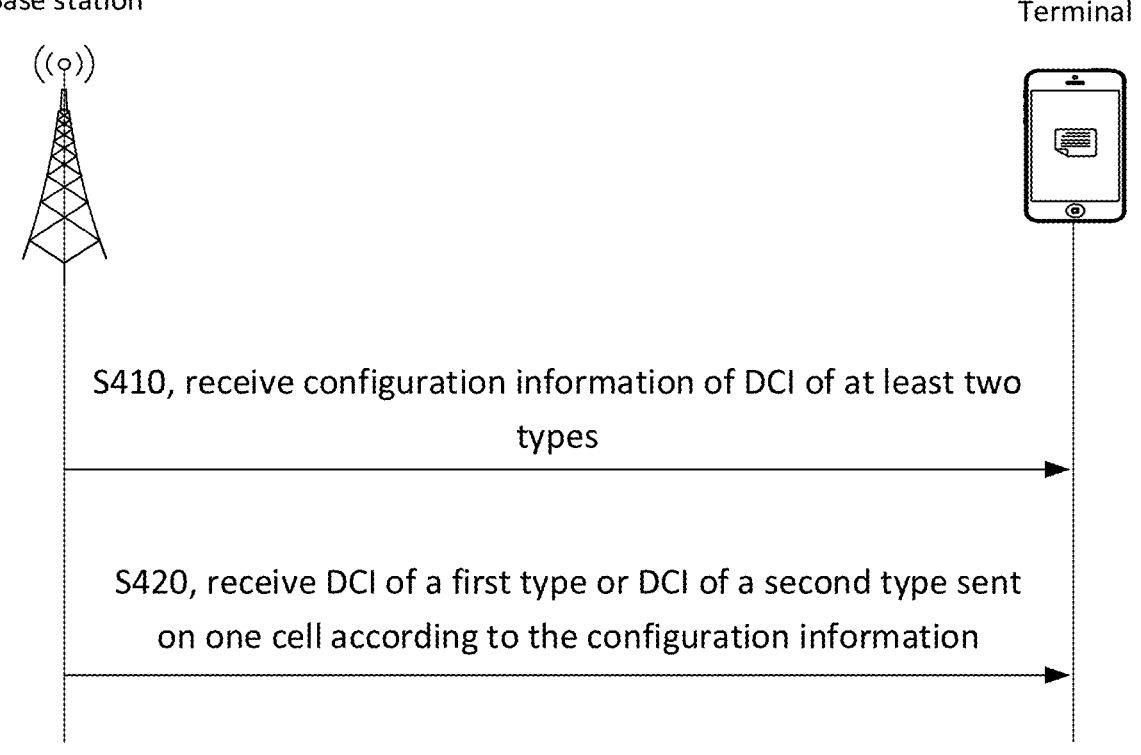
FIG. 4 is a schematic diagram of a method for transmitting downlink control information (DCI) provided by another example of the disclosure.

As shown in FIG. 4, another example of the disclosure further provides a method for transmitting downlink control information (DCI). The method further includes:

step S410, configuration information of DCI of at least two types is received.

In step S310, receiving the DCI sent on the one cell includes:

step S420, DCI of a first type or DCI of a second type sent on one cell is received according to the configuration information.

In an example, the configuration information may contain indication information of DCI types needing to be detected and other detection parameter information. Here, the indication information is used for indicating the terminal what type of DCI detection is performed. In an example, the indication information may be indication information which does not support scheduling for data transmission in a plurality of cells, or may also be indication information which supports scheduling for data transmission in the plurality of cells. In response to determining that the indication information is the indication information which does not support scheduling for data transmission in the plurality of cells, the terminal detects merely the DCI of the first type; and in response to determining that the indication information is the indication information which supports scheduling for data transmission in the plurality of cells, the terminal detects merely the DCI of the second type. Here, the other detection parameter information may contain information of the quantity of times of DCI detections or a cycle of DCI detections or the like.

In an example, the configuration information contains first configuration information and second configuration information. In an example, as for different configuration information, the types of the DCI received by UE are different. In response to determining that the configuration information is the first configuration information, the UE receives the DCI of the first type; and in response to determining that the configuration information is the second configuration information, the UE receives the DCI of the second type.

In an example, the first configuration information contains indication information for the terminal needing to detect the control instruction in the DCI under the condition that scheduling for data transmission in the plurality of cells is not supported; and the second configuration information contains indication information for the terminal needing to detect the control instruction in the DCI under the condition that scheduling for data transmission in the plurality of cells is supported.

As shown in FIG. 5, another example of the disclosure further provides a method for transmitting downlink control information (DCI). In step S410, receiving the configuration information of the DCI of the at least two types includes:

step S510, high-layer signaling or physical layer signaling which carries the configuration information of the DCI of the at least two types is received.

For example, the high-layer signaling or the physical layer signaling carries the configuration information of the DCI of the at least two types.

In an example, the high-layer signaling may be radio resource control (RRC) layer signaling or media access control (MAC) layer signaling. For example, there are the RRC signaling, MAC control element (CE) signaling and the like.

Figure 6:
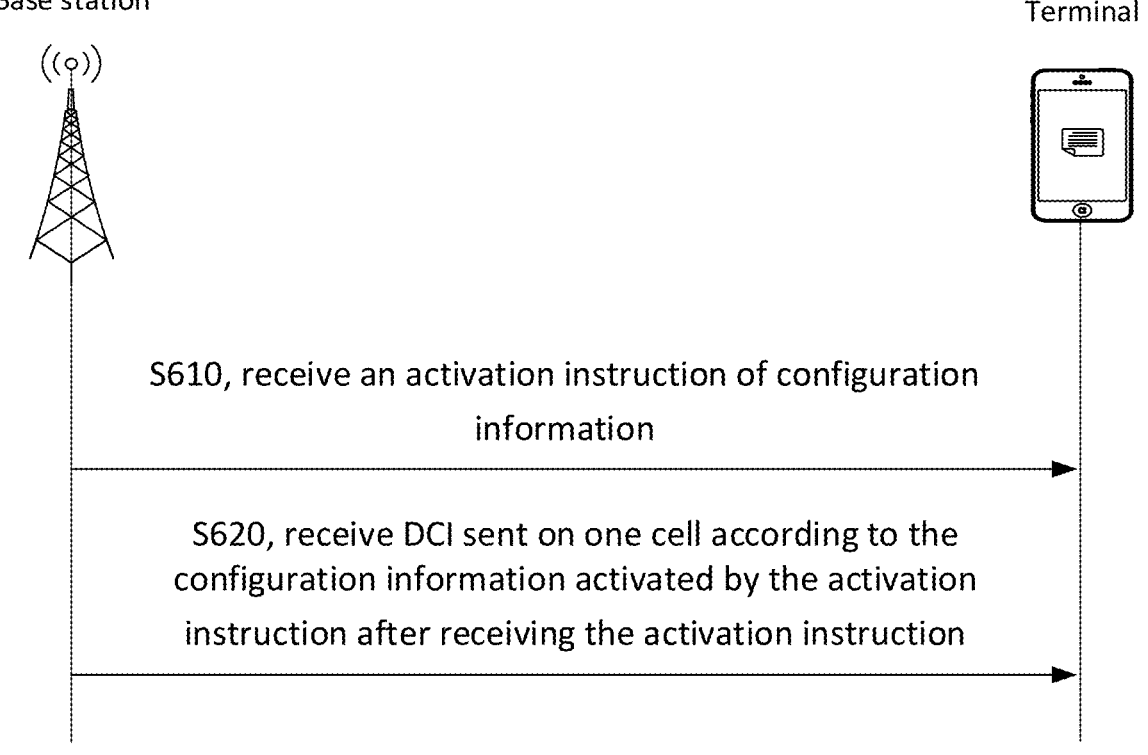
FIG. 6 is a schematic diagram of a method for transmitting downlink control information (DCI) provided by another example of the disclosure.

As shown in FIG. 6, another example of the disclosure further provides a method for transmitting downlink control information (DCI). The method further includes:

step S610, an activation instruction of configuration information is received.

In step S310, receiving the DCI sent on the one cell includes:

step S620, the DCI sent on the one cell is received according to the configuration information activated by the activation instruction after receiving the activation instruction.

In an example, UE stores the received configuration information in a configuration repository. Here, the activation instruction is used for extracting the configuration information from an inactive configuration repository and transferring it into a memory for execution so as to activate the configuration information.

In an example, the high-layer signaling or the physical layer signaling which carries the activation instruction of the configuration information may be received. In an example, the high-layer signaling may be radio resource control (RRC) layer signaling or media access control (MAC) layer signaling. For example, there are the RRC signaling, MAC control element (CE) signaling and the like.

As shown in FIG. 7, another example of the disclosure further provides a method for transmitting downlink control information (DCI). In step S620, receiving the DCI sent on the one cell according to the configuration information activated by the activation instruction includes:

step S710, DCI of a first type sent on one cell is received according to configuration information of the DCI of the first type in response to determining that the activation instruction activates the configuration information of the DCI of the first type; and DCI of a second type sent on one cell is received according to configuration information of the DCI of the second type in response to determining that the activation instruction activates the configuration information of the DCI of the second type.

In an example, after receiving an activation instruction of first configuration information, the first configuration information is extracted from an inactive configuration repository and is transferred into a memory for execution so as to activate the first configuration information, and then the DCI of the first type is received according to the first configuration information activated by the activation instruction. After receiving an activation instruction of second configuration information, the second configuration information is extracted from the inactive configuration repository and is transferred into the memory for execution so as to activate the second configuration information, and then the DCI of the second type is received according to the second configuration information activated by the activation instruction.

Figure 8:
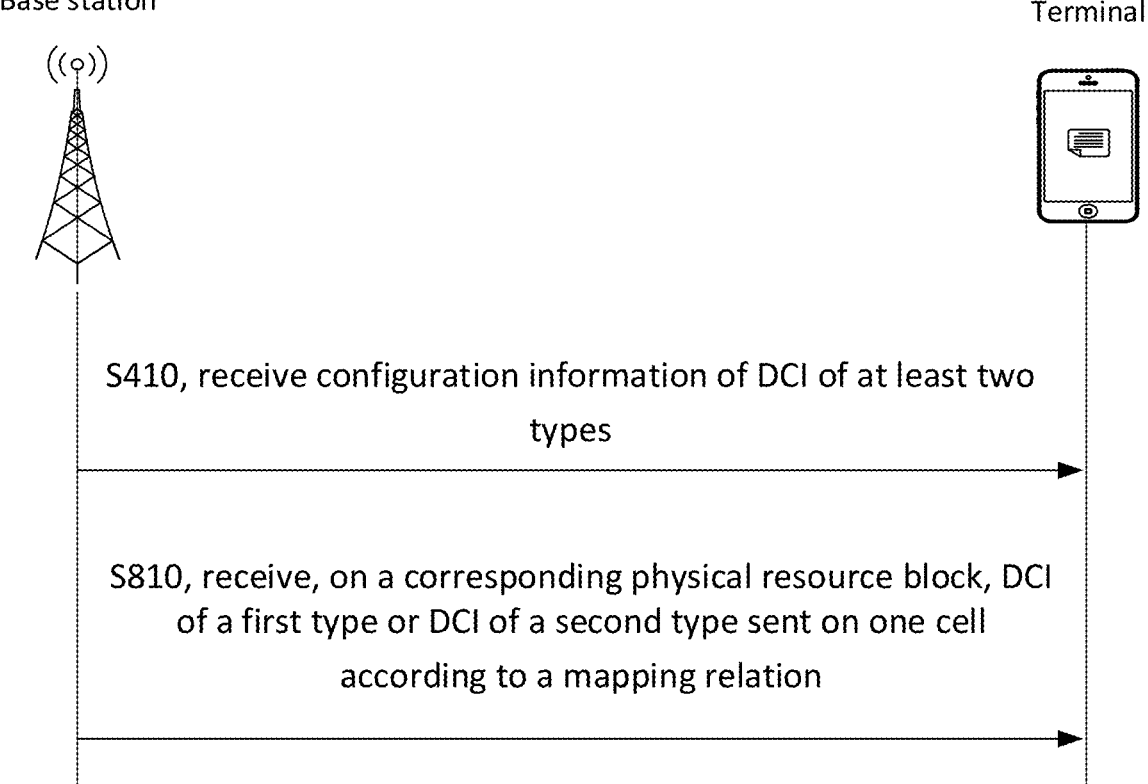
FIG. 8 is a schematic diagram of a method for transmitting downlink control information (DCI) provided by another example of the disclosure.

As shown in FIG. 8, another example of the disclosure further provides a method for transmitting downlink control information (DCI). The configuration information includes: information for indicating a mapping relation between the type of the DCI and resource location information of a physical resource block which sends the DCI.

In step S420, receiving the DCI of the first type or the DCI of the second type sent on the one cell according to configuration information further includes:

step S810, the DCI of the first type or the DCI of the second type sent on the one cell is received on a corresponding physical resource block according to the mapping relation.

In an example, the mapping relation includes: a mapping relation between the DCI of the first type and a time-frequency resource for transmitting the DCI of the first type; and/or, a mapping relation between the DCI of the second type and a time-frequency resource for transmitting the DCI of the second type. In an example, the mapping relation is shown in Table 1:

TABLE 1

| Type of DCI | Time-frequency domain resource for transmitting DCI |
| --- | --- |
| DCI of a first type | First time-frequency domain resource |
| DCI of a second type | Second time-frequency domain resource |

In an example, in response to determining that UE receives the DCI on a physical resource block located in a first time-domain location and/or frequency-domain location, the DCI is determined as the DCI of the first type; and in response to determining that the UE receives the DCI on a physical resource block located in a second time-domain location and/or frequency-domain location, the DCI is determined as the DCI of the second type.

As shown in FIG. 9, another example of the disclosure further provides a method for transmitting downlink control information (DCI). The method further includes:

step S910, received DCI is descrambled; and step S920, a type of the DCI is determined as a first type in response to determining that the DCI is successfully descrambled by using a first descrambling sequence, and the type of the DCI is determined as a second type in response to determining that the DCI is successfully descrambled by using a second descrambling sequence.

In an example, before a base station sends the DCI to a terminal, the DCI of the first type may be scrambled through a first scrambling sequence, and the DCI of the second type may be scrambled through a second scrambling sequence.

In an example, scrambling the DCI may be to perform an Exclusive OR operation on a source data stream of the DCI and one scrambling sequence, so as to obtain a data stream of the scrambled DCI. Here, the scrambling sequence may be a coding sequence. In an example, the scrambling sequence may be the first scrambling sequence or may also be the second scrambling sequence. The first scrambling sequence and the first descrambling sequence are in one-to-one corresponding relation, and the DCI scrambled through the first scrambling sequence can be successfully descrambled merely through the first descrambling sequence. The second scrambling sequence and the second descrambling sequence are in one-to-one corresponding relation, and the DCI scrambled through the second scrambling sequence can be successfully descrambled merely through the second descrambling sequence. In an example, before the base station sends the DCI to the terminal, the first descrambling sequence corresponding to the first scrambling sequence and the second descrambling sequence corresponding to the second scrambling sequence are sent to the terminal. So the terminal can descramble the received DCI based on the first descrambling sequence and the second descrambling sequence.

Figure 10:
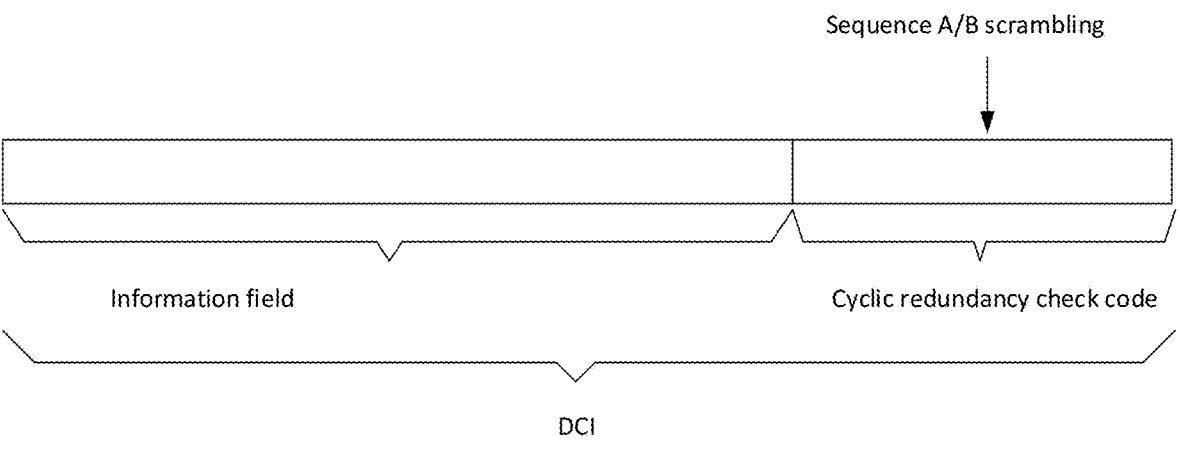
FIG. 10 is a schematic diagram of a DCI information field provided by an example of the disclosure.

Here, the DCI of different types is scrambled by using the different scrambling sequences and each scrambling sequence corresponds to one descrambling sequence, so the type of the DCI can be determined according to whether the descrambling sequence can successfully descramble the DCI scrambled by the scrambling sequence. For example, please refer to FIG. 10 and Table 2, the base station scrambles a cyclic check code of the sent DCI of the first type through a sequence A, so as to indicate that scheduling for data transmission in more than one cells is not supported; and the base station scrambles a cyclic check code of the sent DCI of the second type through a sequence B, so as to indicate that scheduling for data transmission in the plurality of cells is supported. After the terminal receives the DCI, if the DCI can be successfully descrambled through a sequence a, the DCI may be determined as the DCI of the first type, and if the DCI can be successfully descrambled through a sequence b, the DCI may be determined as the DCI of the second type.

TABLE 2

| Scrambling sequence | Descrambling sequence | Type of DCI | Indication information |
| --- | --- | --- | --- |
| Sequence A | Sequence a | DCI of a first type | Scheduling for data transmission in more than one cells is not supported |
| Sequence B | Sequence b | DCI of a second type | Scheduling for data transmission in the plurality of cells is supported |

As shown in FIG. 11, another example of the disclosure further provides a method for transmitting downlink control information (DCI). The method further includes:

step S111, a radio network temporary identity (RNTI) carried by the DCI is obtained; and step S112, a type of the DCI is determined as a first type in response to determining that the RNTI is a first RNTI, and the type of the DCI is determined as a second type in response to determining that the RNTI is a second RNTI.

Figure 12:
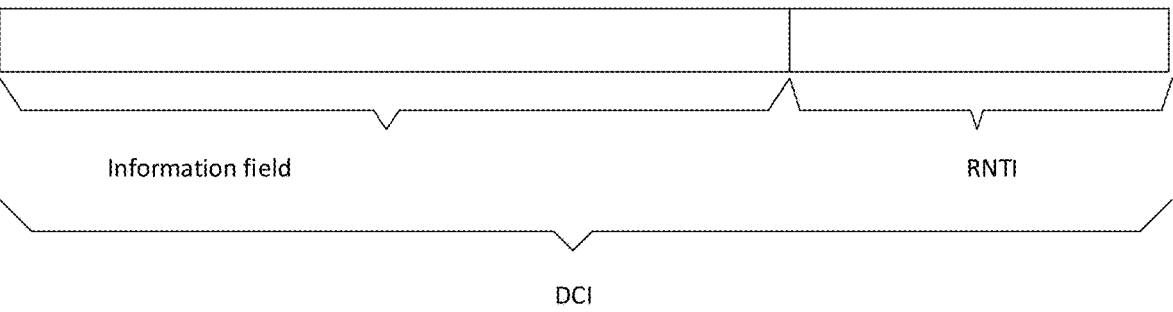
FIG. 12 is a schematic diagram of a DCI information field provided by another example of the disclosure.

Here, values of RNTI in DCI of different types are different, so the type of the DCI may be determined through the values of the RNTI. For example, please refer to FIG. 12 and Table 3, the base station sets the value of the RNTI as RNTI1 so as to indicate that scheduling for data transmission in more than one cells is not supported, and sets the value of the RNTI as RNTI2 so as to indicate that scheduling for data transmission in the plurality of cells is supported. After the terminal receives the DCI, if the value of the obtained RNTI is RNTI1, the DCI may be determined as the DCI of the first type, and if the value of the obtained RNTI is RNTI2, the DCI may be determined as the DCI of the second type.

TABLE 3

| Value of RNTI | Type of DCI | Indication information |
|---|---|---|
| RNTI1 | DCI of a first type | Scheduling for data transmission in more than one cells is not supported |
| RNTI2 | DCI of a second type | Scheduling for data transmission in the plurality of cells is supported |

For better understanding the technical solutions of the disclosure, the technical solutions of the disclosure are further described below through a specific example.

Figure 13:
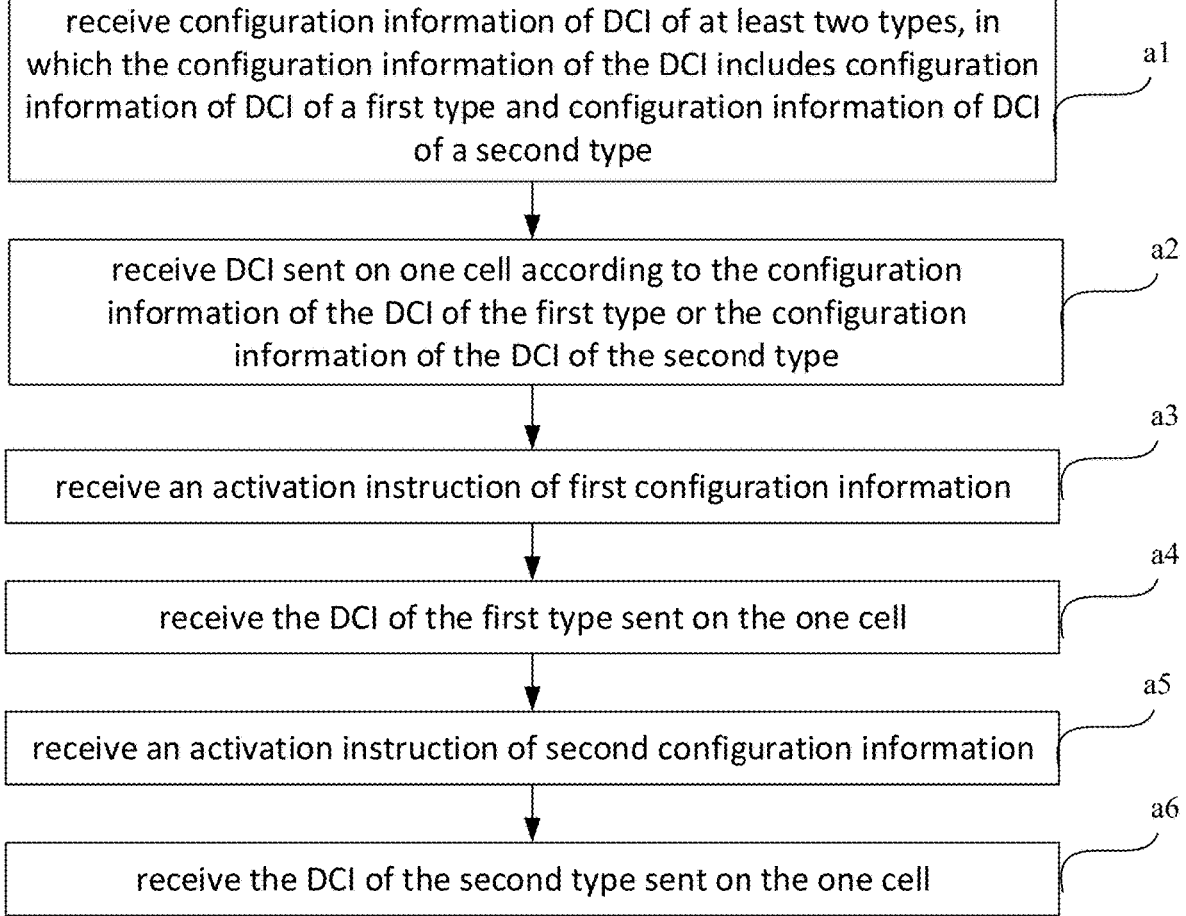
FIG. 13 is a schematic diagram of a method for transmitting downlink control information (DCI) provided by another example of the disclosure.

Example 1: as show in FIG. 13, another example of the disclosure further provides a method for transmitting downlink control information (DCI), performed by a terminal and further including:

step a1, configuration information of DCI of at least two types is received. The configuration information of the DCI includes configuration information of DCI of a first type and configuration information of DCI of a second type. In response to determining that the type of the DCI is the first type, the DCI of the first type carries a control instruction for scheduling data transmission in one cell; and in response to determining that the type of the DCI is the second type, the DCI of the second type carries a control instruction for scheduling data transmission in at least two cells.

Step a2, DCI sent in one cell is received according to the configuration information of the DCI of the first type or the configuration information of the DCI of the second type.

Step a3, an activation instruction of first configuration information is received.

Step a4, the DCI of the first type sent in the one cell is received.

Step a5, an activation instruction of second configuration information is received.

Step a6, the DCI of the second type sent in the one cell is received.

In the present example, before receiving the activation instruction, the DCI is received according to the configuration information of the DCI of the first type or the configuration information of the DCI of the second type. After receiving the activation instruction, corresponding configuration information is selected according to the activation instruction, and the DCI is received based on the configuration information. Here, the DCI carrying the control instruction for scheduling data transmission in the one cell and the DCI carrying the control instruction for scheduling data transmission in the at least two cells are classified, and whether scheduling for data transmission in the one cell or scheduling for data transmission in the at least two cells may be determined fast by detecting the DCI of the two different types after the terminal receives the DCI, so that detection complexity is reduced, and detection efficiency is improved.

As shown in FIG. 14, another example of the disclosure further provides a method for transmitting downlink control information (DCI), performed by a base station and including:

step S141, DCI is sent on one cell.

A type of the DCI includes a first type or a second type; DCI of the first type carries a control instruction for scheduling data transmission in one cell; and DCI of the second type carries a control instruction for scheduling data transmission in at least two cells.

In an example, when the base station issues the DCI to a terminal, the terminal receives the downlink control information (DCI) sent by the base station. Here, the DCI includes identification information of a cell where data transmission is performed. The terminal, after receiving the downlink control information (DCI), performs data transmission according to an indication of the downlink control information (DCI). For example, data transmission is performed in the cell indicated by the identification information. Here, data transmission may be to send uplink data to the base station or may also be to receive downlink data sent by the base station.

In an example, in response to determining that the type of the DCI is the first type, the DCI of the first type carries the control instruction for scheduling data transmission in one cell; and in response to determining that the type of the DCI is the second type, the DCI of the second type carries the control instruction for scheduling data transmission in at least two cells.

In an example, the base station sends the DCI on the one cell, the DCI is the DCI of the first type, and the DCI of the first type carries the control instruction for scheduling data transmission in the one cell.

In another example, the base station sends the DCI on the one cell, the DCI is the DCI of the second type, and the DCI of the second type carries the control instruction for scheduling data transmission in the at least two cells.

In another example, if the base station sends the DCI on the plurality of cells at the same time, the DCI of the first type and the DCI of the second type may be sent at the same time. In an example, each cell may be provided with a carrier wave. Different cells adopt different carrier waves so as to realize coverage of a wireless signal in the cells and complete data transmission in the cells. For example, a cell A adopts a carrier wave 1 to realize coverage of the wireless signal in the cell, and a cell B adopts a carrier wave 2 to realize coverage of the wireless signal in the cell.

In an example, an information field of the DCI may carry identification information for distinguishing the types of the DCI. For example, in response to determining that first identification information is carried in the information field of the DCI, the DCI is the DCI of the first type; and in response to determining that second identification information is carried in the information field of the DCI, the DCI is the DCI of the second type.

In an example, scheduling the terminal for data transmission in the at least two cells may be to issue, in a first cell, a piece of downlink control information (DCI) for scheduling the terminal for data transmission in the at least two second cells. Here, the second cells may be cells different from the first cell. For example, the first cell is the cell A, and the two second cells are the cell B and a cell C respectively. In another example, the second cells may include the first cell. For example, the first cell is the cell A, and the two second cells are the cell A and the cell B respectively. Here, identification information of the second cells may be carried in the downlink control information (DCI).

In the example of the disclosure, firstly, the DCI carrying the control instruction for scheduling data transmission in the one cell and the DCI carrying the control instruction for scheduling data transmission in the at least two cells are classified, and whether scheduling for data transmission in the one cell or scheduling for data transmission in the at least two cells may be determined fast by detecting the DCI of the two different types after the terminal receives the DCI, so that detection complexity is reduced, and detection efficiency is improved. Secondly, the DCI of the second type carries the control instruction for scheduling data transmission in the at least two cells. In this way, scheduling for data transmission in the at least two cells may be realized by issuing merely one piece of DCI, compared with a situation of scheduling for data transmission in one cell by merely one piece of DCI, overhead of control signaling during wireless communication can be effectively reduced, and a utilization ratio of wireless resources is increased.

As shown in FIG. 15, another example of the disclosure further provides a method for transmitting downlink control information (DCI). The method further includes:

step S151, configuration information of DCI of at least two types is sent. The configuration information is used for allowing a terminal to receive DCI of a first type or DCI of a second type.

In an example, the configuration information may contain indication information of DCI types needing to be detected and other detection parameter information. Here, the indication information is used for indicating the terminal what type of DCI detection is performed. In an example, the indication information may be indication information which does not support scheduling for data transmission in a plurality of cells, or may also be indication information which supports scheduling for data transmission in the plurality of cells. In response to determining that the indication information is the indication information which does not support scheduling for data transmission in the plurality of cells, the terminal detects merely the DCI of the first type; and in response to determining that the indication information is the indication information which supports scheduling for data transmission in the plurality of cells, the terminal detects merely the DCI of the second type. Here, the other detection parameter information may contain information of the quantity of times of detections or a cycle of detections or the like.

In an example, the configuration information contains first configuration information and second configuration information. In an example, as for different configuration information, the types of the DCI received by the terminal are different. In response to determining that the configuration information is the first configuration information, the terminal receives the DCI of the first type; and in response to determining that the configuration information is the second configuration information, the terminal receives the DCI of the second type.

In an example, the first configuration information contains indication information for the terminal needing to detect a control instruction in the DCI under the condition that scheduling for data transmission in the plurality of cells is not supported; and the second configuration information contains indication information for the terminal needing to detect the control instruction in the DCI under the condition that scheduling for data transmission in the plurality of cells is supported.

As shown in FIG. 16, another example of the disclosure further provides a method for transmitting downlink control information (DCI). In step S151, sending the configuration information of the DCI of the at least two types includes:

step S161, high-layer signaling or physical layer signaling which carries the configuration information of the DCI of the at least two types is sent.

For example, the high-layer signaling or the physical layer signaling carries the configuration information of the DCI of the at least two types.

In an example, the high-layer signaling may be radio resource control (RRC) layer signaling or media access control (MAC) layer signaling. For example, there are the RRC signaling, MAC control element (CE) signaling and the like.

As shown in FIG. 17 another example of the disclosure further provides a method for transmitting downlink control information (DCI). The method further includes:

step S171, an activation instruction of configuration information is sent. The activation instruction is used for allowing a terminal to receive the DCI according to the configuration information activated by the activation instruction.

In an example, the terminal stores the received configuration information in a configuration repository. Here, the activation instruction is used for extracting the configuration information from an inactive configuration repository and transferring it into a memory for execution so as to activate the configuration information.

In an example, the high-layer signaling or the physical layer signaling which carries the activation instruction of the configuration information may be sent. In an example, the high-layer signaling may be radio resource control (RRC) layer signaling or media access control (MAC) layer signaling. For example, there are the RRC signaling, MAC control element (CE) signaling and the like.

As shown in FIG. 18, another example of the disclosure further provides a method for transmitting downlink control information (DCI). Step S171 includes:

step S181, an activation instruction used for activating configuration information of DCI of a first type is sent in response to determining that scheduling for data transmission in more than one cells is not supported; and an activation instruction used for activating configuration information of DCI of a second type is sent in response to determining that scheduling for data transmission in the plurality of cells is supported.

In an example, after the terminal receives an activation instruction of first configuration information, the first configuration information is extracted from an inactive configuration repository and is transferred into a memory for execution so as to activate the first configuration information, and then the DCI of the first type is received according to the first configuration information activated by the activation instruction. After receiving an activation instruction of second configuration information, the second configuration information is extracted from the inactive configuration repository and is transferred into the memory for execution so as to activate the second configuration information, and then the DCI of the second type is received according to the second configuration information activated by the activation instruction.

In an example, the configuration information includes: information for indicating a mapping relation between the type of the DCI and resource location information of a physical resource block which sends the DCI. The mapping relation is used for allowing the terminal to receive the DCI of the first type or the DCI of the second type on a corresponding physical resource block.

In an example, the mapping relation includes: a mapping relation between the DCI of the first type and a time-frequency resource for transmitting the DCI of the first type; and/or, a mapping relation between the DCI of the second type and a time-frequency resource for transmitting the DCI of the second type.

In an example, in response to determining that the terminal receives the DCI on a physical resource block located in a first time-domain location and/or frequency-domain location, the DCI is determined as the DCI of the first type; and in response to determining that the terminal receives the DCI on a physical resource block located in a second time-domain location and/or frequency-domain location, the DCI is determined as the DCI of the second type.

As shown in FIG. 19, another example of the disclosure further provides a method for transmitting downlink control information (DCI). The method further includes:

step S191, the DCI is scrambled by using a first scrambling sequence in response to determining that a type of the DCI is a first type, and the DCI is scrambled by using a second scrambling sequence in response to determining that the type of the DCI is a second type.

In an example, before a base station sends the DCI to a terminal, the DCI of the first type may be scrambled through the first scrambling sequence, and the DCI of the second type may be scrambled through the second scrambling sequence.

In an example, scrambling the DCI may be to perform an Exclusive OR operation on a source data stream of the DCI and one scrambling sequence, so as to obtain a data stream of the scrambled DCI. Here, the scrambling sequence may be a coding sequence. In an example, the scrambling sequence may be the first scrambling sequence or may also be the second scrambling sequence. The first scrambling sequence and a first descrambling sequence are in one-to-one corresponding relation, and the DCI scrambled through the first scrambling sequence can be successfully descrambled merely through the first descrambling sequence. The second scrambling sequence and a second descrambling sequence are in one-to-one corresponding relation, and the DCI scrambled through the second scrambling sequence can be successfully descrambled merely through the second descrambling sequence. In an example, before the base station sends the DCI to the terminal, the first descrambling sequence corresponding to the first scrambling sequence and the second descrambling sequence corresponding to the second scrambling sequence are sent to the terminal. The terminal descrambles the received DCI based on the first descrambling sequence and the second descrambling sequence.

Here, the DCI of different types is scrambled by using the different scrambling sequences and each scrambling sequence corresponds to one descrambling sequence, so the type of the DCI can be determined according to whether the descrambling sequence can successfully descramble the DCI scrambled by the scrambling sequence. For example, please refer to FIG. 10 and Table 2 again, the base station scrambles a cyclic check code of the sent DCI of the first type through a sequence A, so as to indicate that scheduling for data transmission in more than one cells is not supported; and the base station scrambles a cyclic check code of the sent DCI of the second type through a sequence B, so as to indicate that scheduling for data transmission in the plurality of cells is supported. After the terminal receives the DCI, if the DCI can be successfully descrambled through a sequence a, the DCI can be determined as the DCI of the first type, and if the DCI can be successfully descrambled through a sequence b, the DCI can be determined as the DCI of the second type.

As shown in FIG. 20, another example of the disclosure further provides a method for transmitting downlink control information (DCI). The DCI carries a radio network temporary identity (RNTI). The method further includes:

step S201, the RNTI is configured as a first RNTI in response to determining that a type of the DCI is a first type, and the RNTI is configured as a second RNTI in response to determining that the type of the DCI is a second type.

Here, values of RNTI in DCI of different types are different, so the type of the DCI may be determined through the values of the RNTI. For example, please refer to FIG. 12 and Table 3 again, the base station sets the value of the RNTI as RNTI1 so as to indicate that scheduling for data transmission in more than one cells is not supported, and sets the value of the RNTI as RNTI2 so as to indicate that scheduling for data transmission in the plurality of cells is supported. After the terminal receives the DCI, if the value of the obtained RNTI is RNTI1, the DCI may be determined as the DCI of the first type, and if the value of the obtained RNTI is RNTI2, the DCI may be determined as the DCI of the second type.

Figure 21:
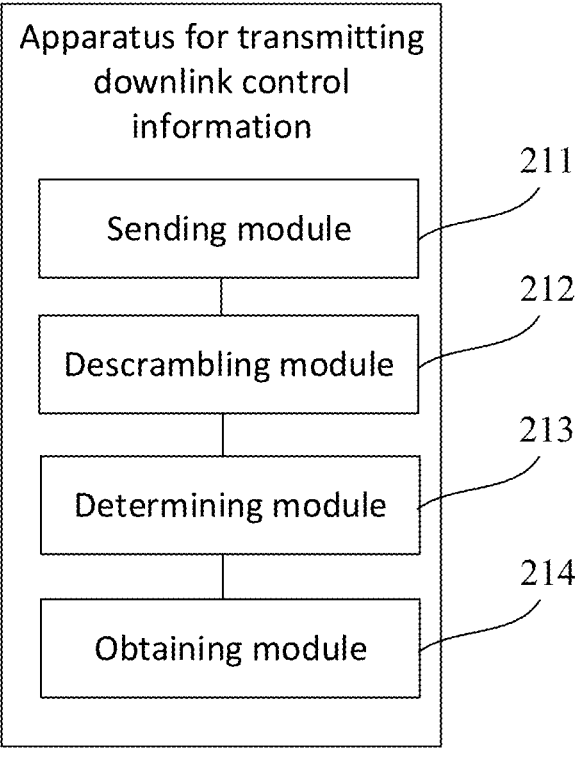
FIG. 21 is a schematic diagram of an apparatus for transmitting downlink control information (DCI) provided by an example of the disclosure.

As shown in FIG. 21, an example of the disclosure further provides an apparatus for transmitting downlink control information (DCI), performed by a terminal. The apparatus includes a receiving module 211.

The receiving module 211 is configured to receive DCI sent on one cell of a base station.

A type of the DCI includes a first type or a second type; DCI of the first type carries a control instruction for scheduling data transmission in one cell; and DCI of the second type carries a control instruction for scheduling data transmission in at least two cells.

In an example, the receiving module 211 is further configured to receive configuration information of DCI of at least two types; and receive the DCI of the first type or the DCI of the second type sent on the one cell according to the configuration information.

In an example, the receiving module 211 is further configured to receive high-layer signaling or physical layer signaling which carries the configuration information of the DCI of the at least two types.

For example, the high-layer signaling or the physical layer signaling carries the configuration information of the DCI of the at least two types.

In an example, the receiving module 211 is further configured to receive an activation instruction of the configuration information; and receive the DCI sent on the one cell according to the configuration information activated by the activation instruction after receiving the activation instruction.

In an example, the receiving module 211 is further configured to receive the DCI of the first type sent on the one cell according to configuration information of the DCI of the first type in response to determining that the activation instruction activates the configuration information of the DCI of the first type; and receive the DCI of the second type sent on the one cell according to configuration information of the DCI of the second type in response to determining that the activation instruction activates the configuration information of the DCI of the second type.

In an example, the configuration information includes: information for indicating a mapping relation between the type of the DCI and resource location information of a physical resource block which sends the DCI; and the receiving module 211 is further configured to receive, on a corresponding physical resource block, the DCI of the first type or the DCI of the second type sent on the one cell according to the mapping relation.

In an example, the apparatus further includes a descrambling module 212 and a determining module 213. The descrambling module 212 is configured to descramble the received DCI. The determining module 213 is configured to determine the type of the DCI as the first type in response to determining that the DCI is successfully descrambled by using a first descrambling sequence, and determine the type of the DCI as the second type in response to determining that the DCI is successfully descrambled by using a second descrambling sequence.

In an example, the apparatus further includes an obtaining module 214. The obtaining module 214 is configured to obtain a radio network temporary identity (RNTI) carried by the DCI. The determining module 213 is further configured to determine the type of the DCI as the first type in response to determining that the RNTI is a first RNTI, and determine the type of the DCI as the second type in response to determining that the RNTI is a second RNTI.

Figure 22:
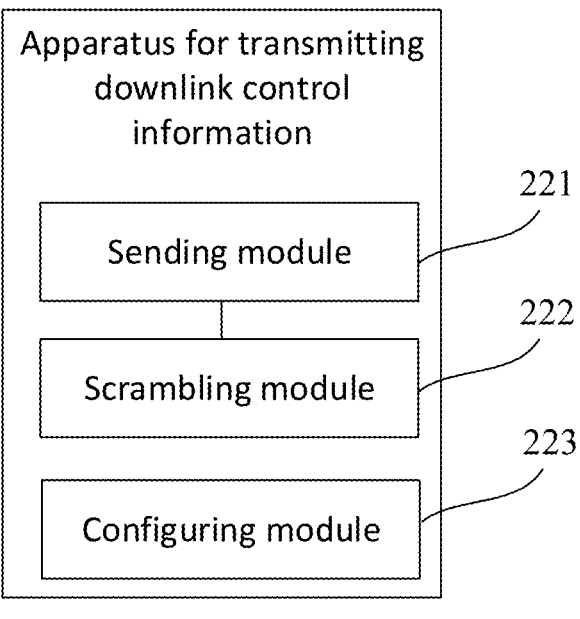
FIG. 22 is a schematic diagram of an apparatus for transmitting downlink control information (DCI) provided by another example of the disclosure.

As shown in FIG. 22, another example of the disclosure further provides an apparatus for transmitting downlink control information (DCI), performed by a base station. The apparatus includes a sending module 221.

The sending module 221 is configured to send DCI on one cell.

A type of the DCI includes a first type or a second type; DCI of the first type carries a control instruction for scheduling data transmission in one cell; and DCI of the second type carries a control instruction for scheduling data transmission in at least two cells.

In an example, the sending module 221 is further configured to send configuration information of DCI of at least two types. The configuration information is used for allowing a terminal to receive the DCI of the first type or the DCI of the second type.

In an example, the sending module 221 is further configured to send high-layer signaling or physical layer signaling which carries the configuration information of the DCI of the at least two types.

For example, the high-layer signaling or the physical layer signaling carries the configuration information of the DCI of the at least two types.

In an example, the sending module 221 is further configured to send an activation instruction of the configuration information. The activation instruction is used for allowing the terminal to receive the DCI according to the configuration information activated by the activation instruction.

In an example, the sending module 221 is further configured to send an activation instruction for activating configuration information of the DCI of the first type in response to determining that scheduling for data transmission in more than one cells is not supported; and send an activation instruction for activating configuration information of the DCI of the second type in response to determining that scheduling for data transmission in the plurality of cells is supported.

In an example, the configuration information includes: information for indicating a mapping relation between the type of the DCI and resource location information of a physical resource block which sends the DCI. The mapping relation is used for allowing the terminal to receive the DCI of the first type or the DCI of the second type on a corresponding physical resource block.

In an example, the apparatus further includes a scrambling module 222. The scrambling module 222 is configured to scramble the DCI by using a first scrambling sequence in response to determining that the type of the DCI is the first type, and scramble the DCI by using a second scrambling sequence in response to determining that the type of the DCI is the second type.

In an example, the DCI carries a radio network temporary identity (RNTI). The apparatus further includes a configuration module 223. The configuration module is configured to configure the RNTI as a first RNTI in response to determining that the type of the DCI is the first type, and configure the RNTI as a second RNTI in response to determining that the type of the DCI is the second type.

An example of the disclosure further provides a communication device, including:

an antenna;

a memory; and a processor, connected with the antenna and the memory respectively and configured to, by executing an executable program stored on the memory, control the antenna to receive and send a wireless signal, such that steps of the method for transmission scheduling provided by any above example can be executed.

The communication device provided by the present example may be the above terminal or base station. The terminal may be various people-carried terminals or vehicle-carried terminals. The base station may be various types of base stations, for example, a 4G base station or a 5G base station, etc.

The antenna may be various types of antennas, for example, a 3G antenna, a 4G antenna or a 5G antenna and other mobile antennas. The antenna may further include: a WiFi antenna or a wireless charging antenna and the like.

The memory may include various types of storage media. The storage medium is a non-transitory computer storage medium and can continue memorizing and storing information on a communication device after the communication device is out of power.

The processor may be connected to the antenna and the memory through a bus and the like and configured to read the executable program stored on the memory, for example, at least one of the methods shown by any example of the disclosure.

An example of the disclosure further provides a non-transitory computer-readable storage medium. The non-transitory computer-readable storage medium stores an executable program. The executable program, when executed by a processor, implements steps of the method for transmission scheduling provided by any above example, for example, at least one of the methods shown by any example of the disclosure.

Figure 23:
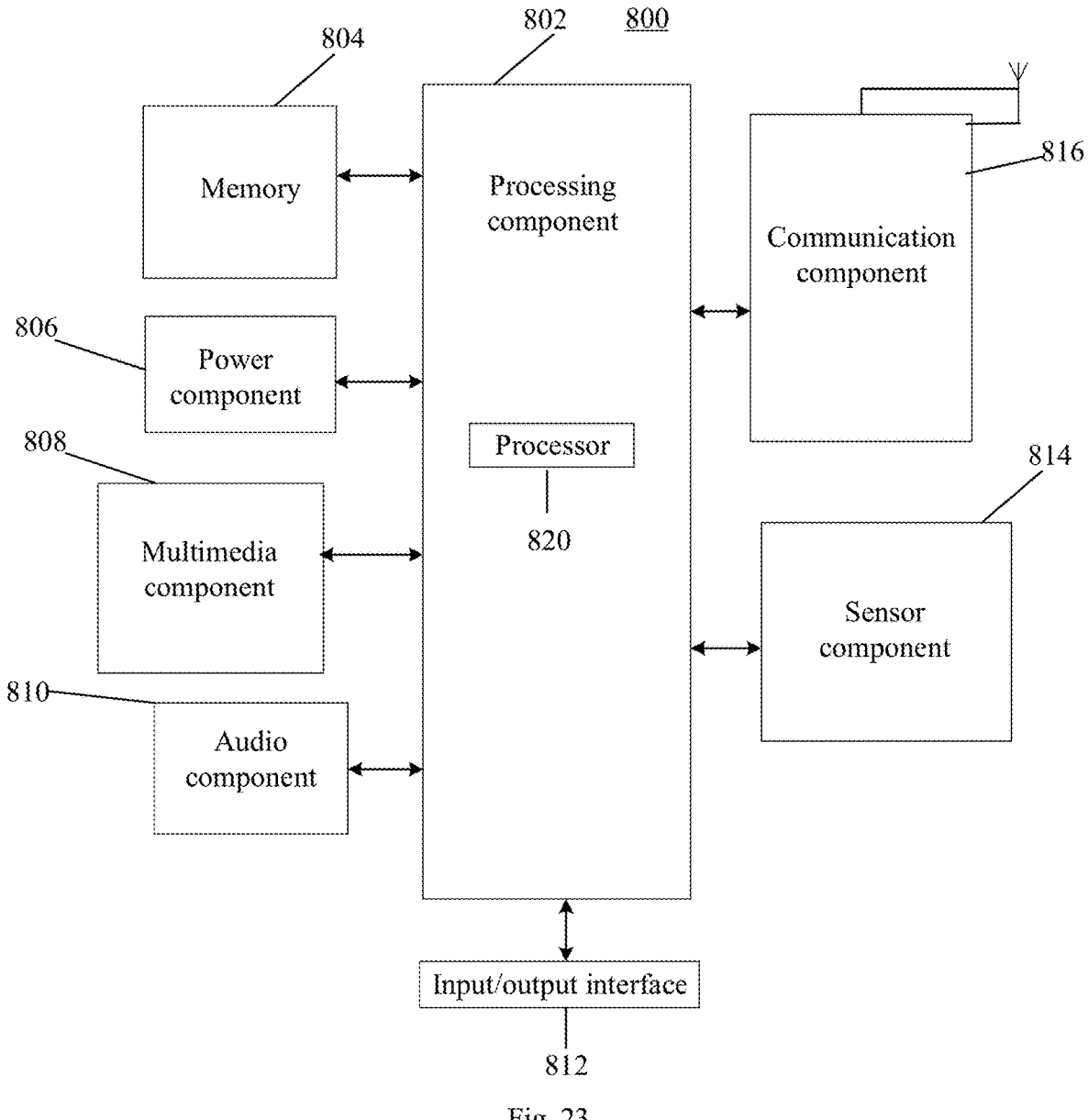
FIG. 23 is a schematic structural diagram of a terminal provided by an example of the disclosure.

As shown in FIG. 23, an example of the disclosure provides a structure of a terminal.

Referring to a terminal 800 shown in FIG. 23, the present example provides a terminal 800. The terminal may be specifically a mobile phone, a computer, a digital broadcast terminal, a messaging device, a game console, a tablet device, a medical device, a fitness facility, a personal digital assistant and the like.

Referring to FIG. 23, the terminal 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the terminal 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the terminal 800. Examples of these data include instructions of any application program or method for operation on the terminal 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the terminal 800. The power component 806 may include a power management system, one or more power sources, and other components related to power generation, management and distribution for the terminal 800.

The multimedia component 808 includes a screen which provides an output interface between the terminal 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the terminal 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the terminal 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the terminal 800. For example, the sensor component 814 may detect a start/shut-down state of the terminal 800 and relative positioning of the components, for example, the components are a display and a keypad of the terminal 800. The sensor component 814 may further detect location change of the terminal 800 or one component of the terminal 800, whether there is contact between the user and the terminal 800, azimuth or speed up/speed down of the terminal 800 and temperature change of the terminal 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and other devices. The terminal 800 may be accessed to a wireless network based on a communication standard, such as Wi-Fi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the terminal 800 may be implemented by one or more than one application specific integrated circuit (ASIC), digital signal processor (DSP), digital signal processing device (DSPD), programmable logic device (PLD), field-programmable gate array (FPGA), controller, microcontroller, microprocessor or other electronic elements for executing the above method.

In an example, a non-transitory computer-readable storage medium including instructions is further provided, such as a memory 804 including the instructions. The above instructions may be executed by a processor 820 of a terminal 800 so as to complete the above method. For example, the non-transitory computer-readable storage medium may be an ROM, a random access memory (RAM), a CD-ROM, a magnetic tape, a floppy disk, an optical data storage device and the like.

The terminal may be configured to implement the above method, for example, the method of any one example of the disclosure.

Figure 24:
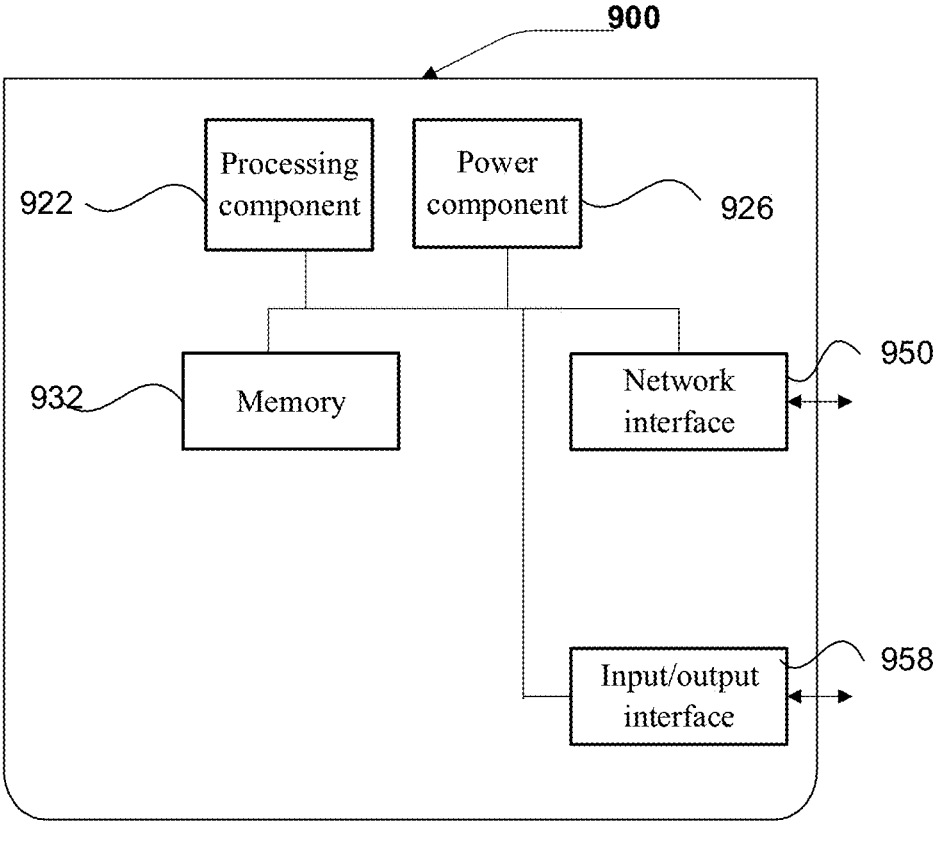
FIG. 24 is a schematic structural diagram of a base station provided by an example of the disclosure.

As shown in FIG. 24, an example of the disclosure provides a structure of a base station. For example, the base station 900 may be provided as a network side device. Referring to FIG. 24, the base station 900 includes a processing component 922 which further includes one or more processors and a memory resource represented by a memory 932, configured to store an instruction capable of being executed by the processing component 922, for example, an application program. The application program stored in the memory 932 may include one or more modules each of which corresponds to a set of instructions. Besides, the processing component 922 is configured to execute an instruction so as to execute the above method, namely, any aforementioned method, for example, the method of any example of the disclosure.

The base station 900 may also include a power component 926 configured to execute power management of the base station 900, a wired or wireless network interface 950 configured to connect the base station 900 to a network, and an input/output (I/O) interface 958. The base station 900 can operate an operating system stored in the memory 932, for example, Windows Server™, Mac OS X™, Unix™, Linux™, FreeBSD™, or the like.

The wireless network interface 950 includes but not limited to an antenna of the above communication device. Those skilled in the art will easily figure out other implementation solutions of the present application after considering the specification and practicing the disclosure disclosed herein. The present application intends to cover any transformation, application or adaptive change of the present application which conforms to a general principle of the present application and includes common general knowledge or conventional technical means which are not disclosed by the disclosure in the technical field. The specification and the examples are merely regarded as examples, and the true scope and spirit of the present application are indicated by the following claims.

It should be understood that the present application is not limited to an accurate structure described above and shown in the drawings, and various modifications and changes can be made without departing from its scope. The scope of the present application is limited merely by appended claims.

According to a first aspect of examples of the disclosure, a method for transmitting downlink control information (DCI) is provided and performed by a terminal, including:

receiving DCI sent on one cell of a base station, in which a type of the DCI includes a first type or a second type;

DCI of the first type carries a control instruction for scheduling data transmission in one cell; and DCI of the second type carries a control instruction for scheduling data transmission in at least two cells.

In an example, the method further includes:

receiving configuration information of DCI of at least two types; and receiving the DCI sent on the one cell includes:

receiving the DCI of the first type or the DCI of the second type sent on the one cell according to the configuration information.

In an example, receiving the configuration information of the DCI of the at least two types includes:

receiving high-layer signaling or physical layer signaling which carries the configuration information of the DCI of the at least two types.

In an example, the method further includes:

receiving an activation instruction of the configuration information, and receiving the DCI sent on the one cell includes:

receiving the DCI sent on the one cell according to the configuration information activated by the activation instruction after receiving the activation instruction.

In an example, receiving the DCI sent on the one cell according to the configuration information activated by the activation instruction includes:

receiving the DCI of the first type sent on the one cell according to the configuration information of the DCI of the first type in response to determining that the activation instruction activates the configuration information of the DCI of the first type; and receiving the DCI of the second type sent on the one cell according to the configuration information of the DCI of the second type in response to determining that the activation instruction activates the configuration information of the DCI of the second type.

In an example, the configuration information includes: information for indicating a mapping relation between the type of the DCI and resource location information of a physical resource block which sends the DCI; and receiving the DCI of the first type or the DCI of the second type sent on the one cell according to the configuration information further includes:

receiving, on a corresponding physical resource block, the DCI of the first type or the DCI of the second type sent on the one cell according to the mapping relation.

In an example, the method further includes:

descrambling the received DCI;

determining the type of the DCI as the first type in response to determining that the DCI is successfully descrambled by using a first descrambling sequence; and determining the type of the DCI as the second type in response to determining that the DCI is successfully descrambled by using a second descrambling sequence.

In an example, the method further includes:

obtaining a radio network temporary identity (RNTI) carried by the DCI;

determining the type of the DCI as the first type in response to determining that the RNTI is a first RNTI; and determining the type of the DCI as the second type in response to determining that the RNTI is a second RNTI.

According to a second aspect of examples of the disclosure, a method for transmitting downlink control information (DCI) is further provided and performed by a base station, including:

sending DCI on one cell, in which a type of the DCI includes a first type or a second type;

DCI of the first type carries a control instruction for scheduling data transmission in one cell; and DCI of the second type carries a control instruction for scheduling data transmission in at least two cells.

In an example, the method further includes:

sending configuration information of DCI of at least two types, in which the configuration information is used for allowing a terminal to receive the DCI of the first type or the DCI of the second type.

In an example, sending the configuration information of the DCI of the at least two types includes:

sending high-layer signaling or physical layer signaling which carries the configuration information of the DCI of the at least two types.

In an example, the method further includes:

sending an activation instruction of the configuration information, in which the activation instruction is used for allowing the terminal to receive the DCI according to the configuration information activated by the activation instruction.

In an example, the method further includes:

sending an activation instruction for activating configuration information of the DCI of the first type in response to determining that scheduling for data transmission in more than one cells is not supported; and sending an activation instruction for activating configuration information of the DCI of the second type in response to determining that scheduling for data transmission in the plurality of cells is supported.

In an example, the configuration information includes: information for indicating a mapping relation between the type of the DCI and resource location information of a physical resource block which sends the DCI, in which the mapping relation is used for allowing the terminal to receive the DCI of the first type or the DCI of the second type on a corresponding physical resource block.

In an example, the method further includes:

scrambling the DCI by using a first scrambling sequence in response to determining that the type of the DCI is the first type; and scrambling the DCI by using a second scrambling sequence in response to determining that the type of the DCI is the second type.

In an example, the DCI carries a radio network temporary identity (RNTI); and the method further includes:

configuring the RNTI as a first RNTI in response to determining that the type of the DCI is the first type; and configuring the RNTI as a second RNTI in response to determining that the type of the DCI is the second type.

According to a third aspect of examples of the disclosure, an apparatus for transmitting downlink control information (DCI) is further provided and performed by a terminal. The apparatus includes a receiving module, in which the receiving module is configured to receive DCI sent on one cell, in which a type of the DCI includes a first type or a second type; DCI of the first type carries a control instruction for scheduling data transmission in one cell; and DCI of the second type carries a control instruction for scheduling data transmission in at least two cells.

In an example, the receiving module is further configured to receive configuration information of DCI of at least two types; and receive the DCI of the first type or the DCI of the second type sent on the one cell according to the configuration information.

In an example, the receiving module is further configured to receive high-layer signaling or physical layer signaling which carries the configuration information of the DCI of the at least two types.

In an example, the receiving module is further configured to receive an activation instruction of the configuration information; and receive the DCI sent on the one cell according to the configuration information activated by the activation instruction after receiving the activation instruction.

In an example, the receiving module is further configured to receive the DCI of the first type sent on the one cell according to the configuration information of the DCI of the first type in response to determining that the activation instruction activates the configuration information of the DCI of the first type; and receive the DCI of the second type sent on the one cell according to the configuration information of the DCI of the second type in response to determining that the activation instruction activates the configuration information of the DCI of the second type.

In an example, the configuration information includes: information for indicating a mapping relation between the type of the DCI and resource location information of a physical resource block which sends the DCI; and the receiving module is further configured to receive, on a corresponding physical resource block, the DCI of the first type or the DCI of the second type sent on the one cell according to the mapping relation.

In an example, the apparatus further includes a descrambling module and a determining module, and the descrambling module is configured to descramble the received DCI; and the determining module is configured to determine the type of the DCI as the first type in response to determining that the DCI is successfully descrambled by using a first descrambling sequence, and determine the type of the DCI as the second type in response to determining that the DCI is successfully descrambled by using a second descrambling sequence.

In an example, the apparatus further includes an obtaining module, and the obtaining module is configured to obtain a radio network temporary identity (RNTI) carried by the DCI; and the determining module is further configured to determine the type of the DCI as the first type in response to determining that the RNTI is a first RNTI, and determine the type of the DCI as the second type in response to determining that the RNTI is a second RNTI.

According to a fourth aspect of examples of the disclosure, an apparatus for transmitting downlink control information (DCI) is provided and performed by a base station. The apparatus includes a sending module, in which the sending module is configured to send DCI on one cell, in which a type of the DCI includes a first type or a second type; DCI of the first type carries a control instruction for scheduling data transmission in one cell; and DCI of the second type carries a control instruction for scheduling data transmission in at least two cells.

In an example, the sending module is further configured to send configuration information of DCI of at least two types, in which the configuration information is used for allowing a terminal to receive the DCI of the first type or the DCI of the second type.

In an example, the sending module is further configured to send high-layer signaling or physical layer signaling which carries the configuration information of the DCI of the at least two types.

In an example, the sending module is further configured to send an activation instruction of the configuration information, in which the activation instruction is used for allowing the terminal to receive the DCI according to the configuration information activated by the activation instruction.

In an example, the sending module is further configured to send an activation instruction for activating configuration information of the DCI of the first type in response to determining that scheduling for data transmission in more than one cells is not supported; and send an activation instruction for activating configuration information of the DCI of the second type in response to determining that scheduling for data transmission in the plurality of cells is supported.

In an example, the configuration information includes: information for indicating a mapping relation between the type of the DCI and resource location information of a physical resource block which sends the DCI, in which the mapping relation is used for allowing the terminal to receive the DCI of the first type or the DCI of the second type on a corresponding physical resource block.

In an example, the apparatus further includes a scrambling module, in which the scrambling module is configured to scramble the DCI by using a first scrambling sequence in response to determining that the type of the DCI is the first type, and scramble the DCI by using a second scrambling sequence in response to determining that the type of the DCI is the second type.

In an example, the DCI carries a radio network temporary identity (RNTI). The apparatus further includes a configuration module, in which the configuration module is configured to configure the RNTI as a first RNTI in response to determining that the type of the DCI is the first type, and configure the RNTI as a second RNTI in response to determining that the type of the DCI is the second type.

According to a fifth aspect of examples of the disclosure, a communication device is provided, including:

an antenna;

a memory; and a processor, connected with the antenna and the memory respectively and configured to, by executing an executable program stored on the memory, control the antenna to receive and send a wireless signal, such that steps of the method provided by any aforementioned technical solution can be executed.

According to a sixth aspect of examples of the disclosure, a non-transitory computer-readable storage medium is provided. The non-transitory computer-readable storage medium stores an executable program, in which the executable program, when executed by a processor, implements steps of the method provided by any aforementioned technical solution.

In the examples of the disclosure, the DCI is received, in which the type of the DCI includes the first type or the second type; the DCI of the first type carries the control instruction for scheduling data transmission in the one cell; and the DCI of the second type carries the control instruction for scheduling data transmission in the at least two cells. Here, the DCI carrying the control instruction for scheduling data transmission in the one cell and the DCI carrying the control instruction for scheduling data transmission in the at least two cells are classified respectively, and whether scheduling for data transmission in the one cell or scheduling for data transmission in the at least two cells may be determined fast by detecting the DCI of the two different types after the terminal receives the DCI, so that detection complexity is reduced, and detection efficiency is improved.

What is claimed is:

1. A method for transmitting downlink control information (DCI), comprising:

receiving, by a terminal, configuration information of a DCI, wherein the configuration information comprises: information for indicating a mapping relation between a type of the DCI and resource location information of a physical resource block which sends the DCI;

after receiving the configuration information, receiving, by the terminal, the DCI, the DCI being transmitted on one cell of a base station in response to the base station scheduling the terminal to perform data transmission in at least two cells, wherein the type of the DCI comprises a second type; and the DCI of the second type carries a control instruction for scheduling data transmission in the at least two cells; and wherein receiving the DCI sent on the one cell comprises:

receiving the DCI of the second type sent on the one cell according to the configuration information; and receiving high-layer signaling or physical layer signaling, wherein the high-layer signaling or the physical layer signaling carries the configuration information of the DCI of the second type;

wherein receiving the DCI of the second type sent on the one cell according to the configuration information further comprises:

receiving, on a corresponding physical resource block, the DCI of the second type sent on the one cell according to the mapping relation.

2. The method according to claim 1, further comprising:

receiving an activation instruction of the configuration information, wherein receiving the DCI sent on the one cell comprises:

receiving the DCI sent on the one cell according to the configuration information activated by the activation instruction after receiving the activation instruction.

3. The method according to claim 2, wherein receiving the DCI sent on the one cell according to the configuration information activated by the activation instruction comprises:

receiving the DCI of the second type sent on the one cell according to the configuration information of the DCI of the second type in response to determining that the activation instruction activates the configuration information of the DCI of the second type.

4. The method according to claim 2, wherein the configuration information is stored in a configuration repository, and the activation instruction is configured for extracting the configuration information from an inactive configuration repository and transferring it into a memory to run so as to activate the configuration information.

5. The method according to claim 1, further comprising:

descrambling the received DCI; and determining the type of the DCI as the second type in response to determining that the DCI is successfully descrambled by using a second descrambling sequence.

6. The method according to claim 1, further comprising:

obtaining a radio network temporary identity (RNTI) carried by the DCI; and determining the type of the DCI as the second type in response to determining that the RNTI is a second RNTI.

7. The method according to claim 1, wherein the DCI comprises identification information of a cell where data transmission is performed, and the data transmission is performed in the cell indicated by the identification information.

8. The method according to claim 1, wherein the configuration information comprises indication information of the DCI types needing to be detected, the indication information is configured for indicating the terminal what type of DCI detection is performed, and in response to determining that the indication information is the indication information which supports scheduling for data transmission in the plurality of cells, the DCI of the second type is detected.

9. A method for transmitting downlink control information (DCI), comprising:

scheduling, by a base station, a terminal to perform data transmission in at least two cells;

sending configuration information of a DCI, wherein the configuration information allows a terminal to receive the DCI of the second type, and the configuration information comprises: information for indicating a mapping relation between a type of the DCI and resource location information of a physical resource block which sends the DCI;

after sending the configuration information, sending, by the base station, the DCI on one cell in response to scheduling the terminal to perform data transmission in at least two cells, wherein

27

28 the type of the DCI comprises a second type; and the DCI of the second type carries a control instruction for scheduling data transmission in the at least two cells;

sending high-layer signaling or physical layer signaling, wherein the high-layer signaling or the physical layer signaling carries the configuration information of the DCI of the second type;

wherein the mapping relation allows the terminal to receive the DCI of the second type on a corresponding physical resource block.

10. The method according to claim 9, further comprising:

sending an activation instruction of the configuration information, wherein the activation instruction allows the terminal to receive the DCI according to the configuration information activated by the activation instruction.

11. The method according to claim 10, further comprising:

sending an activation instruction for activating configuration information of the DCI of the second type in response to determining that scheduling for data transmission in more than one cells is supported.

12. The method according to claim 10, wherein the configuration information is stored in a configuration repository, and the activation instruction is configured for extracting the configuration information from an inactive configuration repository and transferring it into a memory for execution so as to activate the configuration information.

13. The method according to claim 9, further comprising:

scrambling the DCI by using a second scrambling sequence in response to determining that the type of the DCI is the second type.

14. The method according to claim 9, wherein the DCI carries a radio network temporary identity (RNTI), and the method further comprises:

configuring the RNTI as a second RNTI in response to determining that the type of the DCI is the second type.

15. The method according to claim 9, wherein the DCI comprises identification information of a cell where data transmission is performed, and the data transmission is performed in the cell indicated by the identification information.

16. The method according to claim 9, wherein the configuration information comprises indication information of the DCI types needing to be detected, the indication information is configured for indicating the terminal what type of DCI detection is performed, and in response to determining that the indication information is the indication information which supports scheduling for data transmission in the plurality of cells, the DCI of the second type is detected.

17. A communication device, comprising:

an antenna;

a memory; and a processor, connected with the antenna and the memory respectively and configured to, by executing a computer executable instruction stored on the memory, control receiving and sending of the antenna, so as to:

receive configuration information of a downlink control information (DCI), wherein the configuration information comprises: information for indicating a mapping relation between a type of the DCI and resource location information of a physical resource block which sends the DCI;

after receiving the configuration information, receive the DCI sent on one cell of a base station in response to the base station scheduling a terminal to perform data transmission in at least two cells, wherein the type of the DCI comprises a second type; and the DCI of the second type carries a control instruction for scheduling data transmission in the at least two cells; and wherein receiving the DCI sent on the one cell comprises:

receiving the DCI of the second type sent on the one cell according to the configuration information;

receiving high-layer signaling or physical layer signaling, wherein the high-layer signaling or the physical layer signaling carries the configuration information of the DCI of the second type;

wherein receiving the DCI of the second type sent on the one cell according to the configuration information further comprises:

receiving, on a corresponding physical resource block, the DCI of the second type sent on the one cell according to the mapping relation.

18. A non-transitory computer storage medium, wherein the non-transitory computer storage medium stores a computer executable instruction, wherein the computer executable instruction, when executed by a processor, implements the method provided by claim 1.

19. A communication device, comprising:

an antenna;

a memory; and a processor, connected with the antenna and the memory respectively and configured to, by executing a computer executable instruction stored on the memory, control receiving and sending of the antenna, such that the method provided by claim 9 can be implemented.

20. A non-transitory computer storage medium, wherein the non-transitory computer storage medium stores a computer executable instruction, wherein the computer executable instruction, after executed by a processor, can implement the method provided by claim 9.

* * * * *